INVENTORS
EDWIN C. JACKSON
CHARLES F. FREDE

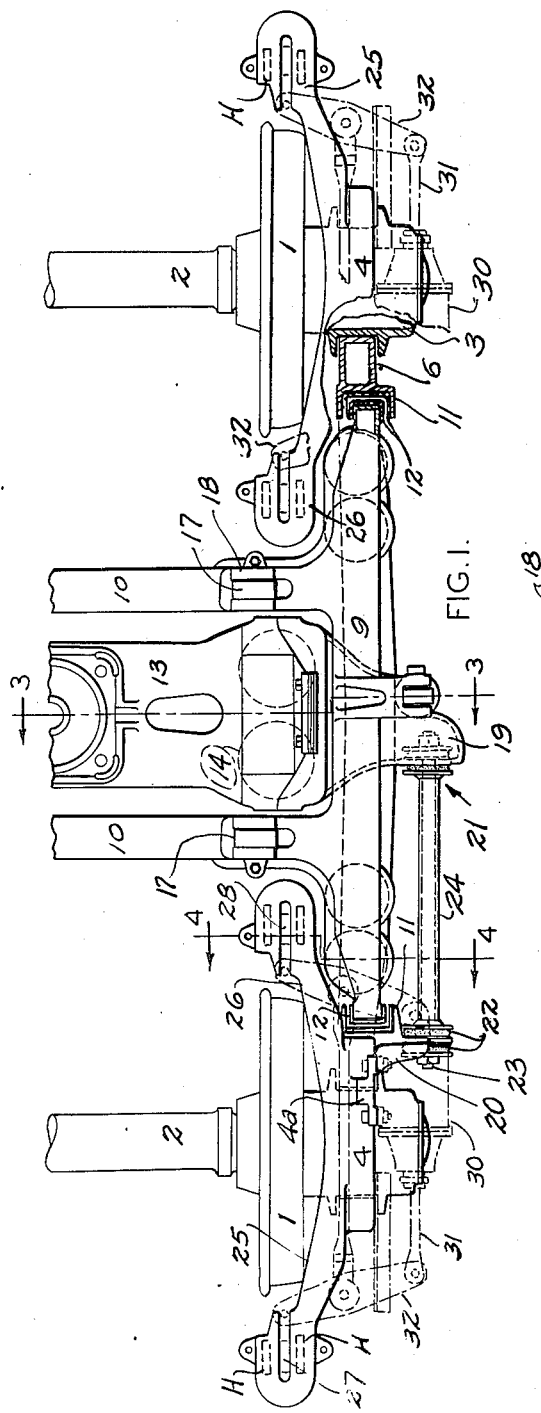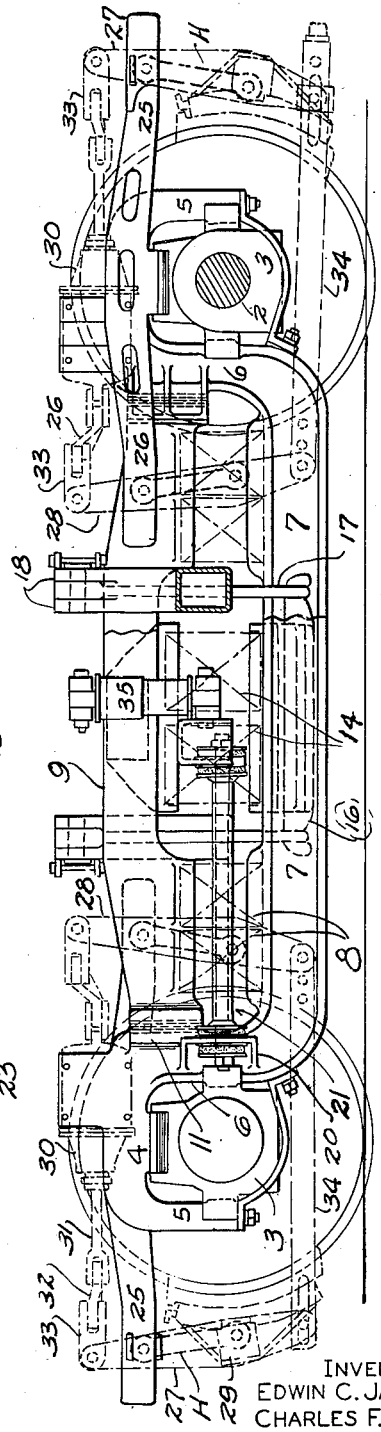

ATTORNEY

Patented June 26, 1945

2,379,005

UNITED STATES PATENT OFFICE 2,379,005

RAILWAY TRUCK

Edwin C. Jackson, Clayton, and Charles F. Frede, University City, Mo., assignors to General Steel Castings Corporation, Granite City, Ill., a corporation of Delaware Application February 17, 1943, Serial No. 476,162

10 Claims. (Cl. 105—190)

The invention relates to railway rolling stock truck structure, and more particularly to the assembly of the journal boxes, equalizers, truck main frame, separate bolster and brake gear and consists in all the novel subject matter illustrated in the accompanying drawings and described herein.

The invention may be embodied in an equalized truck of the type in which the truck main frame is spring-supported upon the equalizers and mounts springs which support the truck bolster on which the vehicle body is carried. In such trucks, longitudinal forces between the vehicle bodies and the trucks are transmitted to the truck bolsters and from the latter to the truck frame and from the latter to the journal boxes if the frame is provided with box-receiving pedestals, or from the truck frame to the equalizers and then to the journal boxes if a pedestalless type of frame is used, or vice versa. Usually the brake gear, including the air brake cylinder or other power device, is mounted in whole or in part upon the truck frame and forces set up by the application of the brakes are transmitted to the truck frame and through the latter to the bolster and vehicle body.

One object of the present invention is to free the truck frame from longitudinal forces and this object is attained by transmitting those forces from the bolster directly to the equalizer and thence to the axles independently of the truck frame.

Another object of the invention is to mount the brake gear on the equalizer so that the brake gear, particularly the brake shoes, will move vertically with the wheels at all times and the truck frame will be relieved of forces set up by the application of the brakes. This provides a smoother riding truck by eliminating brake noises and chattering that would otherwise be set up if the brake moved vertically relative to the wheels. It also makes it possible to lighten the truck frame and the truck, reducing the cost of manufacturing the truck and operating it.

Another object of the invention is to facilitate access to the brake gear and particularly to those portions positioned inwardly of the truck from the sides of the truck frame.

These and other detail objects as will appear from the following description are attained by the structure illustrated in the accompanying drawings, in which—

Figure 1 is a top view of one longitudinal half of a four wheel truck, a portion of the structure being sectioned horizontally to more clearly illustrate the construction.

Figure 2 is in part a side elevation and in part a vertical longitudinal section through the center of the structure shown in Figure 1.

Figure 3:
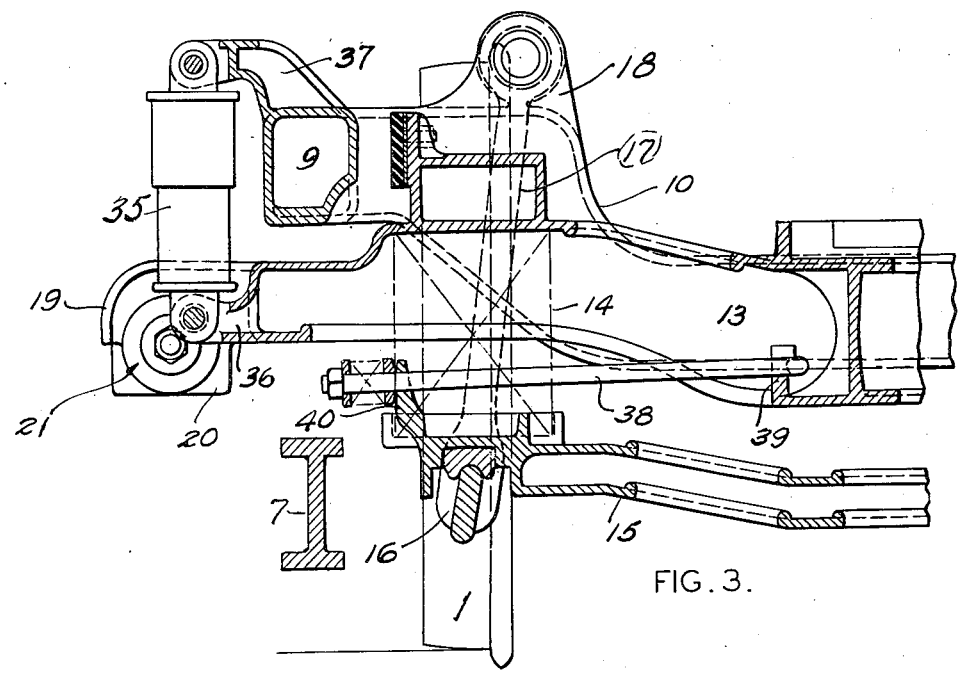
Figures 3 and 4 are detail transverse sections taken on the corresponding section lines of Figure 1.
Figure 4:
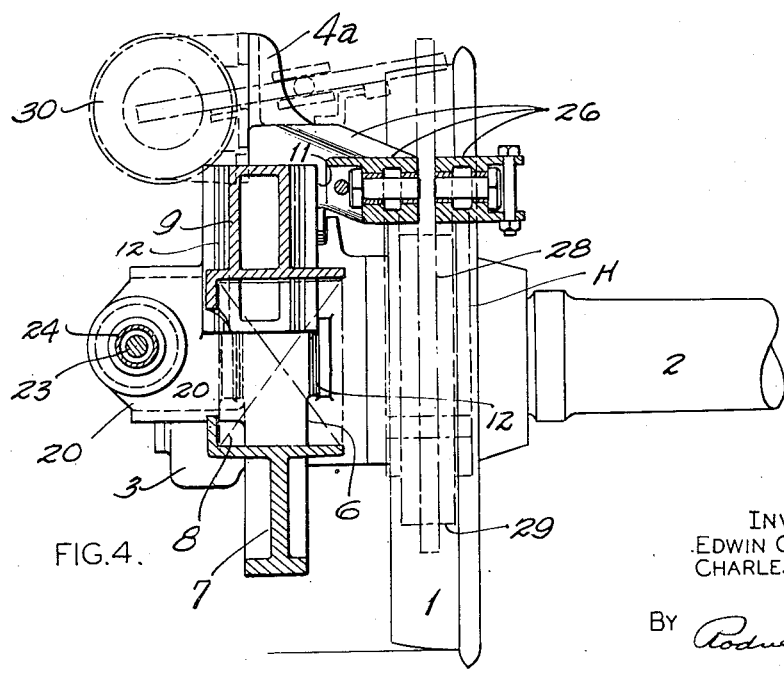

The truck includes the usual wheels 1, axles 2 and journal boxes 3. Drop equalizers extend between journal boxes at the same side of the truck and include inverted U-shaped portions each receiving one of the journal boxes and including an elevated horizontal portion 4 resting on the box, a depending outer leg 5, and a depending inner leg 6. The equalizer has an intermediate low level portion 7 extending between and merging with the lower ends of inner legs 6 of the inverted U-shaped end portions. Coil springs 8 are mounted upon the intermediate portion of each equalizer, and the truck main frame is carried upon springs 8.

The main frame includes side members 9 and spaced transoms 10. Frame side members 9 terminate adjacent to the inner legs 6 of the equalizer end portions and preferably these legs have channel-like jaws 11 receiving the ends of the truck frame side members. Jaws 11 and the adjacent portions of the frame may be provided with renewable liners 12 to take up wear between these parts caused by the relative vertical movement of the frame and equalizers due to the action of springs 8. Jaws 11 limit the movement of the frame transversely and longitudinally of the truck relative to the equalizers.

The truck bolster 13 is carried by the truck frame in a well known manner, being mounted upon bolster springs 14 seated upon a spring plank 15 which, in turn, is mounted upon a cross bar 16 carried on the lower ends of swing hangers 17 suspended at their upper ends from brackets 18 on frame transoms 10. This mounting provides for the vertical movement of the bolster relative to the frame, equalizers and wheeled axles because of the action of the bolster springs and provides for the movement of the bolster laterally of the truck relative to the truck frame, equalizers and wheeled axles because of the action of swing hangers 17. Each end of bolster 13 is provided with a bracket 19 extending laterally of the truck beneath and beyond the frame side member 9.

Each equalizer leg 6 is provided with a bracket 20 extending laterally and outwardly of the truck. An elongated anchoring device 21 extends longitudinally of the truck and has one end connected to bracket 19 and the other end connected to bracket 20. This device is of the type illustrated and described in V. L. Green Reissue Patent No. 21,987, issued December 30, 1941 and includes rubber pads 22 clamped against opposite sides of upright webs of the brackets by a bolt 23 extending through a tubular strut 24.

Devices 21 hold the bolster and equalizers against substantial movement longitudinally of the truck but the devices may be inclined from their normal position to accommodate the relative movements of the bolster and equalizers transversely and vertically of the truck. Because of the anchorage of the bolster to the equalizers by devices 21 and because of the spring mounting of the bolster upon the frame, the latter is freed of the transmission of longitudinal forces between the body and the wheeled axles, and the fit between the jaws 11 on the equalizers and the adjacent portions of the truck frame positions the truck frame in the truck and provides sufficient clearances to prevent binding both longitudinally and transversely of the truck during relative vertical movement of the truck frame and equalizers.

Formed integrally with each equalizer elevated end portion 4 are brackets 25 and 26 extending from portion 4 inwardly and longitudinally of the truck, bracket 25 extending towards the end of the truck and opposite to the wheel tread and bracket 26 extending towards the middle of the truck and opposite to the wheel tread. Hangers H are suspended from the portions of these brackets most remote from the journal box and carry the brakes indicated at 29. Brake levers 27 and 28 are carried by brakes 29 and the brakes for each axle are applied by an individual power device such as an air cylinder 30 mounted on an upstanding bracket 4a on the equalizer and connected to a suitable reservoir (not shown) on the vehicle body. The cylinder and its piston rod 31 are connected by equalizing levers 32 and clevises 33 to the upper ends of brake levers 27 and 28 which are connected at their lower ends by a rod 34. The brake mounting relieves the truck frame of the weight of the brake gear and of forces and shocks arising from the application of the brakes. Each bracket 26 extends alongside of and at substantially the same level as the end portion of the truck side frame and is an improvement over previous arrangements of equalizer carried brake gear in which a comparatively heavy bracket extends from the low level portion of the equalizer inwardly and upwardly around the frame supporting springs. In addition to eliminating unnecessary weight, the construction provides a simpler equalizer casting and affords ample clearance for the brake gear below the brackets.

The movements of the bolster relative to the truck frame and the equalizers are further controlled by devices thus shown in Figure 3, such as the telescoping shock absorbers 35 each connected at its opposite ends to a bracket 36 on the bolster and to a bracket 37 on the frame side member and by a transverse yielding anchorage 38 connected at its inner end to a bracket 39 on the bolster and at its outer end to a bracket 40 on the spring plank. These control devices do not in themselves form parts of the present invention but cooperate with the previously described structure to improve the easy riding qualities of the truck by reducing and eliminating the sudden application of forces between the vehicle running gear and body.

The structure attains the objectives set forth in the introductory portion of the specification and the structure may be varied in detail without departing from the spirit of the invention, and the exclusive use of such modifications as come within the scope of the claims is contemplated.

What is claimed is:

1. In a railway truck, spaced wheeled axles with journal boxes, equalizers extending between and supported by boxes spaced apart longitudinally of the truck, a truck frame spring-supported on the equalizers, a bolster, means yieldingly supporting the bolster on the truck frame, and devices connecting the bolster and equalizers independently of the truck frame and journal boxes and holding the bolster and equalizers against substantial relative movement longitudinally of the truck and accommodating their relative vertical movement, there being elements on the equalizer for supporting brake gear independently of the truck frame.

2. In a railway truck, spaced wheeled axles with journal boxes, equalizers extending between and supported on boxes spaced apart longitudinally of the truck and having downwardly opening jaws receiving the boxes to hold the boxes and the axles against relative movement longitudinally of the truck, a truck main frame, means yieldingly supporting said frame on the equalizers, the frame and equalizers having upright elements opposing each other to position the frame longitudinally and transversely of the truck independently of the journal boxes, a body-carrying bolster supported on the frame and movable vertically relative thereto, and an anchoring device connected to the bolster and equalizer independently of said frame and journal boxes and holding the bolster and equalizer against substantial relative movement longitudinally of the truck and preventing transmission through said opposed elements of longitudinal thrusts between the wheeled axles and the vehicle body carried on the bolster.

3. In a railway truck, spaced wheeled axles with journal boxes, drop equalizers extending between and supported on boxes at the same side of the truck and each having inverted U-shaped end portions fitting over the associated journal boxes and each having an intermediate low level portion, springs mounted on the intermediate portions of the equalizers, a truck main frame having side members mounted on said springs and terminating adjacent to but spaced from the inner upright legs of the end portions of the equalizers, a load-carrying bolster supported on said frame so as to move relative thereto, a bracket at each end of the bolster, a bracket on one of the adjacent equalizer legs, said brackets extending laterally of the truck outwardly of said frame, and an elongated anchoring device at each side of the truck having one end connected to the bolster bracket and having its other end connected to the equalizer bracket and holding the bolster and equalizer against substantial relative movement longitudinally of the truck independently of the frame and journal boxes.

4. A railway truck as described in claim 1 which includes brakes applicable to the axle wheels, and operating means therefor all supported on the equalizer elements independently of the truck frame.

5. In a railway truck, spaced wheeled axles with journal boxes, an equalizer extending between and carried on journal boxes at the same side of the truck, springs on the equalizer and adjacent the journal boxes supporting the equalizer, a truck load-supporting frame having center transoms and side members connecting said transoms and including portions extending beyond said transoms longitudinally of the truck and mounted on said springs and terminating short of said boxes, and a bracket on the equalizer projecting from a journal box-engaging portion of the equalizer inwardly of the truck and extending longitudinally of the truck abreast of the adjacent spring-supported frame portion and forming a brake gear support, independently of the truck frame, opposite the corresponding wheel rim.

6. In a railway truck, spaced wheeled axles with journal boxes, an equalizer extending between and carried on journal boxes at the same side of the truck, springs on the equalizer and adjacent the journal boxes supporting the equalizer, a truck load-supporting frame having center transoms and side members connecting said transoms and including portions extending beyond said transoms longitudinally of the truck and mounted on said springs and terminating short of said boxes, brackets on the equalizer projecting from a journal box-engaging portion of the equalizer inwardly of the truck and extending longitudinally of the truck at substantially the same level as said frame portions and forming brake gear supports, independently of the truck frame, opposite the rim of the corresponding wheel, one between the latter and the center transoms and the other at the opposite side of the wheel.

7. In a railway truck, spaced wheeled axles with journal boxes, a drop equalizer bar with relatively high level end portions carried on said boxes and a relatively low level intermediate portion all lying in the same general vertical longitudinal plane, said low level portion having spring seats near its ends, springs thereon, a truck frame including side members carried on said springs, there being brackets on said high level end portions projecting inwardly therefrom and extending longitudinally of the truck inwardly of said frame side members and at substantially the same level as said frame side members for supporting brake gear independently of the truck frame.

8. In a railway truck, spaced wheeled axles, equalizers extending between and supported thereby, a truck frame having spring supports on the equalizers, a bolster, means yieldingly supporting the bolster on the truck frame, and devices elongated longitudinally of the truck with the opposite ends of each device connected to the bolster and an equalizer respectively at opposite sides of the corresponding spring support and independently of the truck frame and holding the bolster and equalizers against substantial relative movement longitudinally of the truck and accommodating their relative vertical movement.

9. In a railway truck, spaced wheeled axles with journal boxes, an equalizer extending between boxes spaced apart longitudinally of the truck, the equalizer having yoke-like ends resting on the tops of the associated boxes and embracing the opposite sides of the boxes to position the boxes longitudinally of the truck, a truck frame spring-supported from the equalizer, a bolster spring-supported from the truck frame, and a cushioning device connected directly to the bolster and equalizer and positioning them relative to each other longitudinally of the truck independently of the truck frame and providing for relative vertical movement of the journal boxes, bolster and truck frame free of sliding engagement between said parts under longitudinal thrusts between the bolster and journal boxes.

10. A truck as described in claim 9 in which the support for the bolster provides for relative movement of the bolster and truck frame transversely of the truck, and the cushioning device and its connections to the bolster and equalizer accommodate such relative transverse movement.

EDWIN C. JACKSON.
CHARLES F. FREDE.